*NO PRINTED SPECIFICATION AVAILABLE*
1025X
A. STEARNS.
Dyeing Machine.
Patented March 22, 1809
Fig. 1,
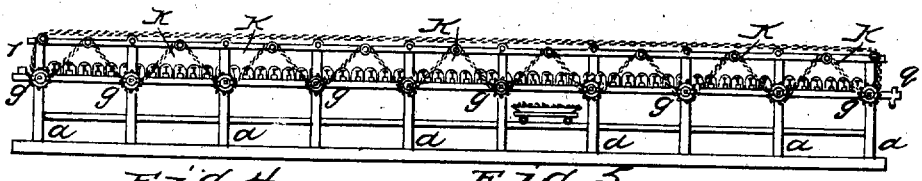
Fig. 4,
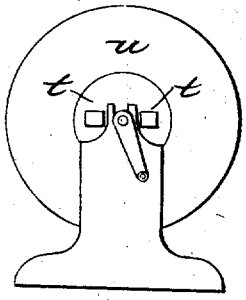
Fig. 5,
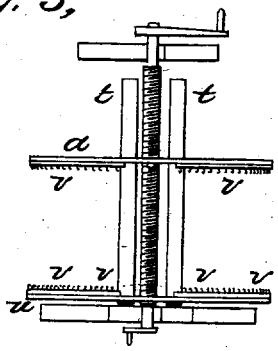
Fig. 2,
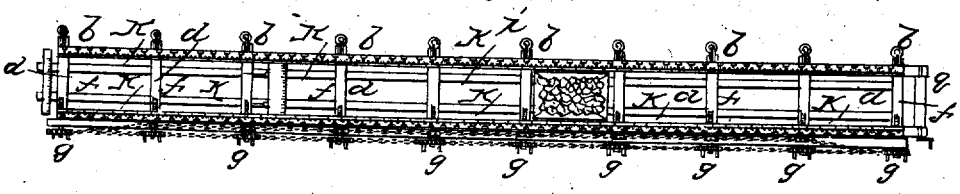
Fig. 3,
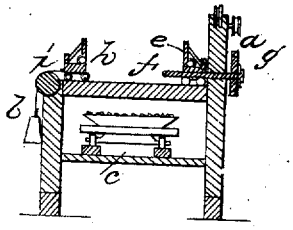
Fig. 6,
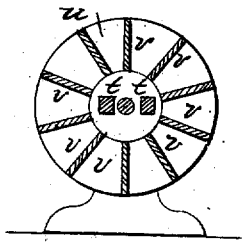

1025X

Abner Stearns

Letters Patent. Issued Mar. 22. 1809.

The schedule referred to in these Letters Patent and making part of the same containing a description in the words of the said Abner Stearns, himself of his machine to color & finish silk Stuffs &c. –

The machine consists first of ten front posts 7 feet high & 6 ft. apart. 2nd of ten rear posts 4 ft. high placed directly behind the front posts. 3d of ten lower girths 5 ft. 6 long placed one foot high between the front and rear posts. 4th of ten upper girths 5 ft. 6 long placed 2 ft. 9 in. above the lower girths. – 5th of one front cheek 8 in. wide, and 56 feet long, which is moved backwards and forwards on the upper girths by the screws 6th of ten screws, which pass through the cogg wheels and under rollers in the front posts, to the front cheek to which they are confined. – 7th of ten cog wheels which being turned on the screws move the front cheek to or from the rear cheek, to a distance corresponding with the width of the silk. the cog wheels are confined to the front posts by clasps, which, take hold of washers confined to the back side of the wheels 8th of one rear cheek, which is occasionally moved backwards and forwards on the upper girths by a line passing thro' pullies and staples, in the under side of the cheek and in the heads of the rear posts, 9th of one hundred & twelve caps one foot long & 6 inches wide, which are fastened with hinges on the upper side of the cheeks.

Both cheeks have two rollers on their under side at each girth. & both are lined (as are all the the caps) on their inside with tinned copper. Each cap has a brace confined at one end by a staple, near the edge opposite the hinges of the caps, and each brace has a concave foot piece, near the outer edge of the cheeks. 10th of a cap piece placed on the tops of the front posts, 56 ft long, having rollers in the center between the several posts – 11th of a chain Band which revolves thro' the whole machine under the several cog wheels and over the rollers next above them respectively above the cap piece, & is carried back by rollers in the top of some of the front posts which are extended above the machine for that purpose each cog wheel has two handles opposite each other, in front by which, any wheel being turned the band revolves and the whole ma machine is put in motion. The whole may be turned to the right or left by the former the front cheek is drawn forwards by the latter it is pressed backwards towards the rear cheek, Thus the cheeks are regulated at a distance proper for the reception of silks of any width. 12th of a cradle way consisting of two slips of plank or board, three feet apart on the lower girths 56 feet long. 13th of a cradle which moves along the way upon trucks with a pair of scale for drying the silk 14th of a needle bar which rests across the cheeks, at one end with small points to which the end of the silk is affixed 15th of a small roller at the end of the machine opposite the needle bar, upon which the silk is wound from the reel. 16th of a stay clasp which is a board 4ft long & 14 in. wide, having several clasps 3 in. wide (coppered like the caps) which are opened and closed with screws. and 17th of a reel with 3 wooden axes and two copper heads the inner axle is a screw with a swivel on one end turning in one head, & with a crank on the other end which turns the screw, and thus moves the head next the crank to a distance from the other head equal to the width of the silk to be dyed. the other axles (placed as near the screw as may be on opposite sides) are square. They are confined in the head where the swivel is, and pass thro mortices in the head next the crank. The head next the crank slides on the two last mentioned axles. Each head has ten arms & 52 curved hooks on each arm, or may have any greater or lesser number In the use of the machine, the two corners at one end of the silk are applied to two inner hooks on opposite heads and opposite arms of the reel. Then the reel is turned and the silk affixed to hooks till the whole is wound up. Thus the silk is distended so as to have no wrinkles, and the dye stuff can circulate freely between the several laminae. Then the reel is suspended by one head into the dye stuff, it is plunged into cold water until sufficiently cleansed. Then it is stiffened with a composition of gum commonly used for that purpose, by pouring the composition upon the silk distended as above directed, or by plunging it in a vessel containing the composition.

Then the silk is wound from the reel on the smaller roller at the end of the machine opposite the needle bar. It is next taken from the roller & the end affixed to the needle bar and spread along the machine upon the upper girths. The edges of the silk are then applied to the copper plates upon the cheeks, and confined there by raising and bracing the caps. Thus the silk is distended the whole length of the machine. Or if the web be not so long as the machine, the end is confined in the stay clasp, & that fastened by a line to either of the girths. Next by turning either of the cog

1025X wheels to the right the front chuck is drawn forwards by the screw, till the silk is properly distended. The cradle is then moved slowly on the [illegible] with a pan of coals till the silk is perfectly dry. Then if the web be longer than the table, the dried part is wound into a cylinder placed behind the needle bar, and turned with a crank & the remainder applied to the machine as before ———

Witness.

Joseph Adams }
James Perkins }

Abner Stearns

Drawing [illegible] March 18[illegible] Ext. [illegible] — Chk.

1072 [illegible]